United States Patent [19]
Hollins

[11] 3,799,572
[45] Mar. 26, 1974

[54] ASSEMBLY FOR PROTECTING A PASSENGER OF A VEHICLE

[76] Inventor: Jesse R. Hollins, 1 Chester Dr., Great Neck, N.Y. 11021

[22] Filed: Oct. 7, 1971

[21] Appl. No.: 187,286

[52] U.S. Cl.............................. 280/150 B, 296/84 K
[51] Int. Cl............................................. B60r 21/00
[58] Field of Search..... 280/150 B; 296/78 R, 84 K; 248/478, 221

[56] References Cited
UNITED STATES PATENTS

| 3,279,817 | 10/1966 | Henry | 280/150 B |
| 3,198,543 | 8/1965 | Presunka | 280/150 B |
| 3,494,633 | 2/1970 | Malloy | 280/150 B |
| 3,583,764 | 6/1971 | Lohr et al. | 280/150 SB |
| 3,494,583 | 2/1970 | Parr | 248/221 |
| 3,384,334 | 5/1968 | Malachowski | 248/478 |
| 3,339,876 | 9/1967 | Kampa | 248/478 |

FOREIGN PATENTS OR APPLICATIONS
697,837  11/1964  Canada .......................... 280/150 B Primary Examiner—Kenneth H. Betts
Assistant Examiner—David M. Mitchell

[57] ABSTRACT

This is an assembly for protecting a passenger of a vehicle. The assembly includes a padded cushion and means coupled to said cushion for moving the cushion between the horizontal and vertical position. The moving means is hinged fastened to an abutment in front of passenger's seat. The cushion is moved to the vertical position when the passenger is entering or exiting the seat, and is moved toward the horizontal position after the passenger is seated so that the end of the cushion is adjacent to the passenger's body when he is seated. Means are provided for allowing the passenger to adjust the horizontal position of the cushion for his own comfort.

5 Claims, 14 Drawing Figures

PATENTED MAR 26 1974 3,799,572

INVENTOR.
JESSE R. HOLLINS

PATENTED MAR 26 1974 3,799,572

INVENTOR.
JESSE R. HOLLINS

ASSEMBLY FOR PROTECTING A PASSENGER OF A VEHICLE

BACKGROUND OF THE INVENTION

1. Field of the Invention

This invention relates to an assembly for protecting an occupant of a vehicle.

2. Description of the Prior Art

The most frequently used means for protecting the occupant of a vehicle is the seat belt. Unfortunately, most vehicle passengers tend to neglect to fasten their seat belt, thus the seat belt does not always render protective service.

To compensate for the lack of use of the current seat belts, the installation of air bags in vehicles is being considered. The air bag is supposed to be designed so that it will inflate immediately upon the sensing of a predetermined force of impact upon the vehicle. As the air bag inflates to its material size, its position should be between the occupant of the vehicle and the instrument panel and windshield area. The speed and force with which the gas must fill the bag creates a sound so loud that permanent damage to the occupant's eardrums may occur, especially if the vehicle's windows are closed. The sudden impact of the inflated bag on the occupant's body, especially his head, can result in severe physical damage to him. Timing the inflation of the bag prior to the movement of the occupant during the momentary period of the accident is unpredictable and uncontrollable; thus its safety value is questionable. There is no assurance that the bag will not unnecessarily inflate when there is merely a sharp and sudden jolt of the vehicle, which often happens when the vehicle's wheels encounter a hole (pothole) in the roadway. Sudden deceleration and stopping of the vehicle is often necessary in order to prevent an accident, which deceleration or stopping causes the occupant to be thrown forward from his seated position. Since there is no vehicle impact, the air bag does not inflate, thus it does not render any occupant protective service. Since the air bag and its triggering mechanism remain dormant, unless the vehicle is involved in a severe accident, there is no assurance that the air bag mechanism will function when needed. As the air bag's mechanism cannot be tested upon being installed and periodic testing cannot be made, there is never positive assurance that the air bag system will ever function. The installation of an air bag, its triggering and inflating mechanism are costly to produce and install, even when the installation is made during the assembly of the vehicle. Once the air bag has inflated, its life has ended and the gas in the cylinder has escaped. A new bag and a fully charged cylinder is required, necessitating their installation and connection in order to re-establish the air bag system. At present, air bag installation is considered only for protection of the passenger occupant of the front seat of the vehicle.

SUMMARY OF THE INVENTION

1. Purpose of the Invention

It is an object of this invention to provide for a more convenient system for protecting a passenger occupant of a vehicle.

It is still another object of this invention to provide a simple and inexpensive assembly for protecting an occupant of a vehicle during the entire time he occupies the vehicle, and particularly when the vehicle undergoes a sudden deceleration or swerving movement.

Other objects of the invention will in part be obvious and in part be pointed out hereinafter.

2. Brief Description of the Invention

According to a broad aspect of the invention, there is provided an assembly for protecting a passenger of a vehicle comprising a padded cushion, and means coupled to said cushion for moving said cushion between a horizontal and vertical position, said moving means being supported by an abutment located in front of a seat for said passenger, whereby said cushion is moved toward the vertical position when the passenger is entering or exiting the seat and said cushion is moved toward the horizontal position after said passenger is seated, the end of said cushion being adjacent to the passenger's body when he is seated.

A feature of this invention includes means coupled to said moving means for sliding said cushion toward and away from said abutment so as to allow the passenger to comfortably place said cushion the desired distance from his body when he is seated.

Another feature of the invention provides that said padded cushion is comprised of an internal tubular frame and padded material surrounding said frame.

Still another feature of the invention includes an engaging hook extending from a side of said padded cushion and coupled to said internally tubular frame, and a slotted bar attached to a door adjacent to the side of said cushion, said slotted bar being positioned to receive said engaging hook when said cushion is moved to or below the horizontal position, thereby preventing the door from flying open in the event the door latching mechanism does not hold the door closed during an accident, or to assure that no one can open the door even if the door lock is not in service.

A further feature of this invention includes a hook extending from a side of said padded cushion and coupled to said internal tubular frame, and a retractable strap, one end of said strap being anchored to the floor of said vehicle, the other end of said strap having a slot formed adjacent thereto for receiving said hook when said cushion is placed at or near the horizontal position, thereby preventing the occupant from falling out of the vehicle during an accident in the event of the door opening due to impact.

A still further feature of the invention provides that said moving means includes first and second spring loaded hinges wherein each of said hinges is comprised of an "L" shaped plate, one side of said plate being fastened to the abutment, another side of said plate having a hole formed therein, a tubular member, one end of said member being telescopically positioned within a portion of said tubular frame, another end of said member being positioned adjacent said "L" shaped plate, said member having a hole formed therein located adjacent said other end thereof, a formed plate having a hole and recess therein, one face of said formed plate being positioned adjacent said tubular member, and a pin passing through the holes in the respective "L" shaped plate, tubular member and formed plate, the complete hinge being spring loaded, the recess in said formed plate being so located as to allow said tubular member and cushion to move relatively freely between approximately the vertical position and a plane between the vertical and horizontal position.

In still another feature of the invention, said sliding means is coupled to each spring loaded hinge, and that portion of said sliding means coupled to each hinge includes a first plate having a hole therein fastened to said cushion, a second plate having a hole therein, one end of said second plate being fastened to said first plate, said tubular member passing through the holes in the respective first and second plates, wherein the diameter of the hole in said second plate is larger than the diameter of the tubular member to such a degree as to allow the plane of said second plate to shift relative to the plane of the axis of said tubular member, a compression hinge connected between the respective top portions of said first and second plates to force said second plate to move to a plane such that the top and bottom parts of the hole in said second plate engages said tubular member in an angular position to act as a lock to prevent said padded cushion from moving relative to said tubular member, and a bar coupled to a top edge of said second plate whereby the forward movement of the bar acts as the lock release thus allowing said padded cushion to be moved in relation to said tubular member.

BRIEF DESCRIPTION OF DRAWINGS

In the accompanying drawings in which are shown various possible embodiments of my invention.

DESCRIPTION OF THE PREFERRED EMBODIMENTS

Figure 1:
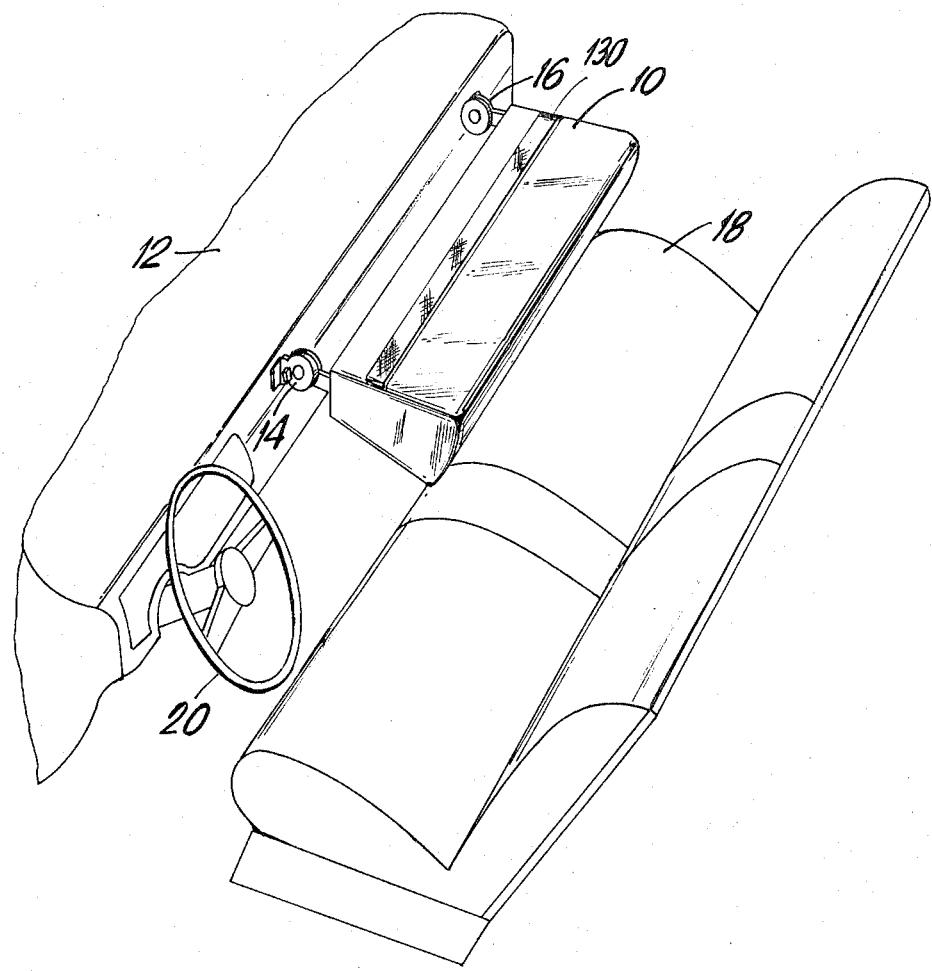
FIG. 1 is a perspective view of the padded cushion in the horizontal position and hinge coupled to the instrument panel of an automobile.

While FIG. 1 is a perspective view of a padded cushion 10 which is hinge connected to an instrument panel 12 of an automotive vehicle, it is to be understood that the padded cushion could be attached to other types of vehicles. Cushion 10 is shown attached to instrument panel 12 via hinges 14 and 16, which hinges are located toward opposite sides of the cushion. The cushion in this instance is shown in its horizontal position placed adjacent a front seat 18 in front of the passenger section of the front seat and to the side of a steering wheel 20.

Figure 2:
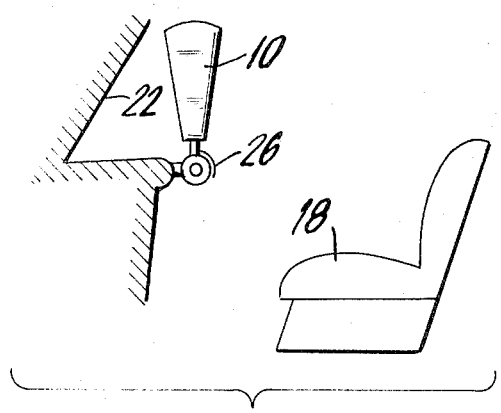
FIG. 2 is a side view of the padded cushion shown in FIG. 1 when the cushion is in the vertical position.
Figure 3:
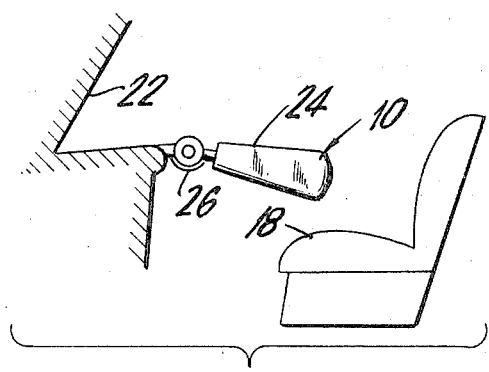
FIG. 3 is a side view of the padded cushion shown in FIG. 1 when the cushion is in the horizontal position.

FIG. 2, which is a side view of cushion 10 shown in FIG. 1, shows cushion 10 is in the vertical position adjacent a windshield 22 of the vehicle. FIG. 3, which is a side view of cushion 10 shown in FIG. 1, shows the plane of the top surface 24 of cushion 10 to be inclined slightly below the horizontal position by an angle of approximately 5 to 10 degrees so as to prevent the cushion from being pushed towards the vertical position if a passenger, who is sitting between seat 18 and cushion 10, is suddenly thrust forward.

Figure 4:
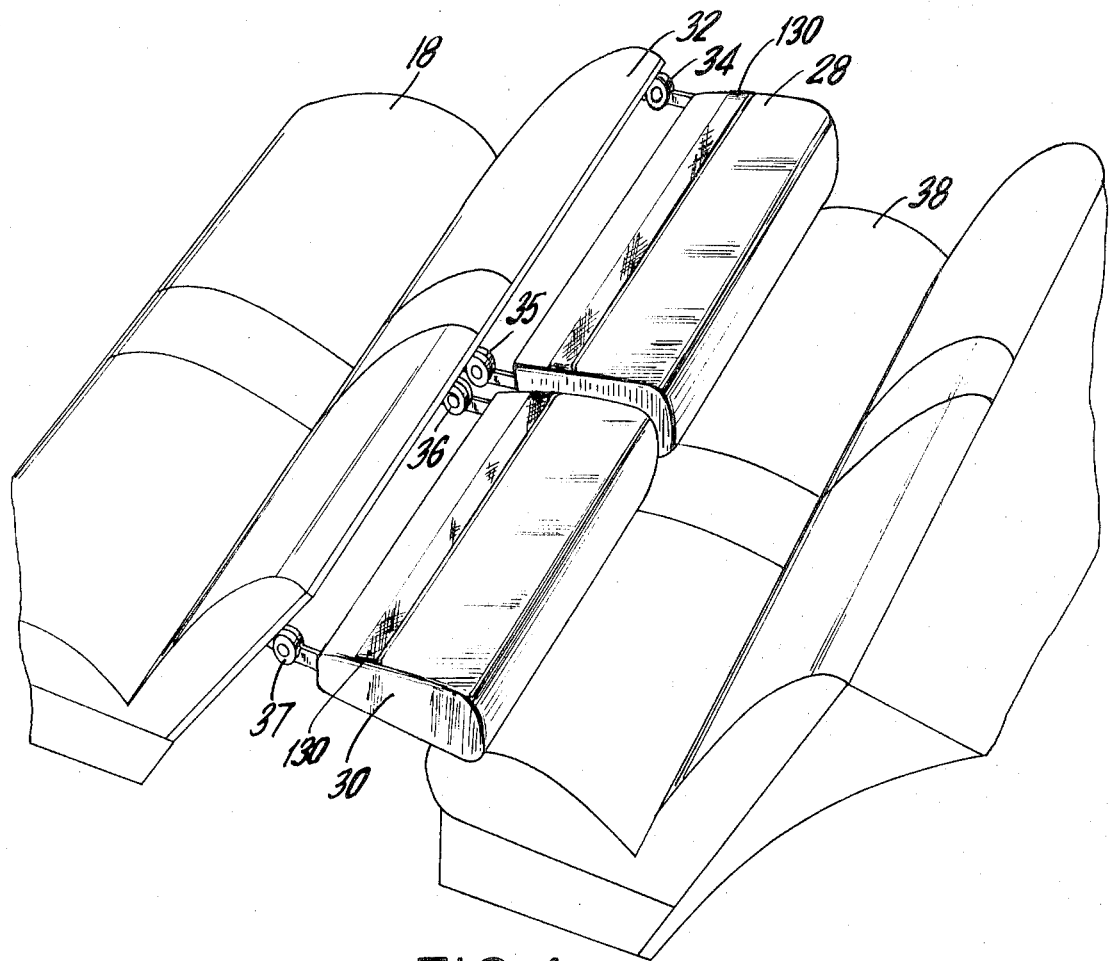
FIG. 4 is a perspective view of the padded cushion in the horizontal position and coupled to the rear of the front seat of the vehicle.
Figures 5, 6:
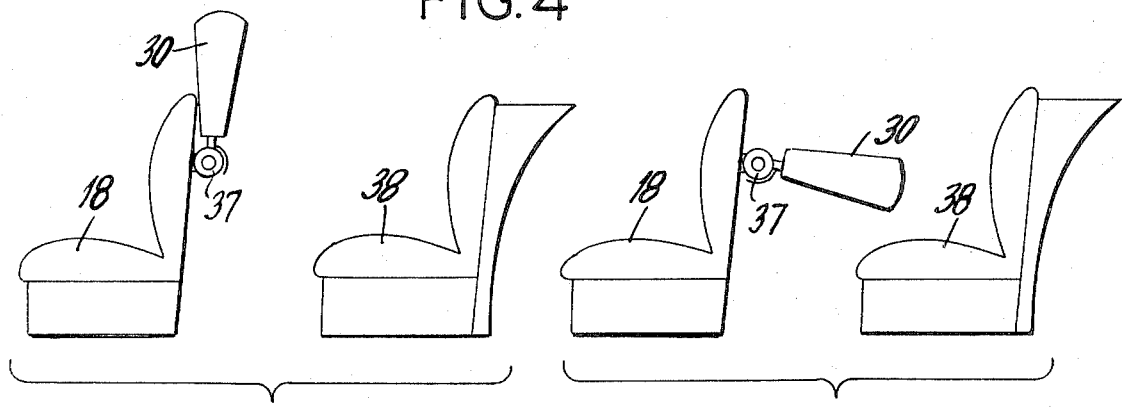
FIG. 5 is a side view of the padded cushion shown in FIG. 4 when the cushion is in the vertical position.
FIG. 6 is a side view of the padded cushion shown in FIG. 4 when the cushion is in the horizontal position.

The hinge can have a stop plate 26 shown in FIGS. 2 and 3 which plate limits the downward movements of the cushion. Referring to FIG. 4, there is shown a perspective view of two padded cushions 28 and 30 attached to an abutment, which in this instance is a rear wall 32 of front seat 18 of the automotive vehicle shown in FIG. 1. It should be understood, of course, that the abutment represented by rear wall 32 could be made part of and located on an airplane, train, bus, etc. Separate cushions 28 and 30 are attached to rear wall 32 via separate pairs of respective hinges 34 and 35, and 36 and 37, and are provided for the passengers who sit in rear seat 38 of the automotive vehicle. Separate cushions are more specifically provided for convenience of operation, since it might tend to be difficult for a passenger to maneuver one large cushion which extends the width of the automobile when the passenger is seated near a side of said vehicle. FIGS. 5 and 6 show a side view of cushion 30 in the respective vertical and near horizontal positions.

Figure 7:
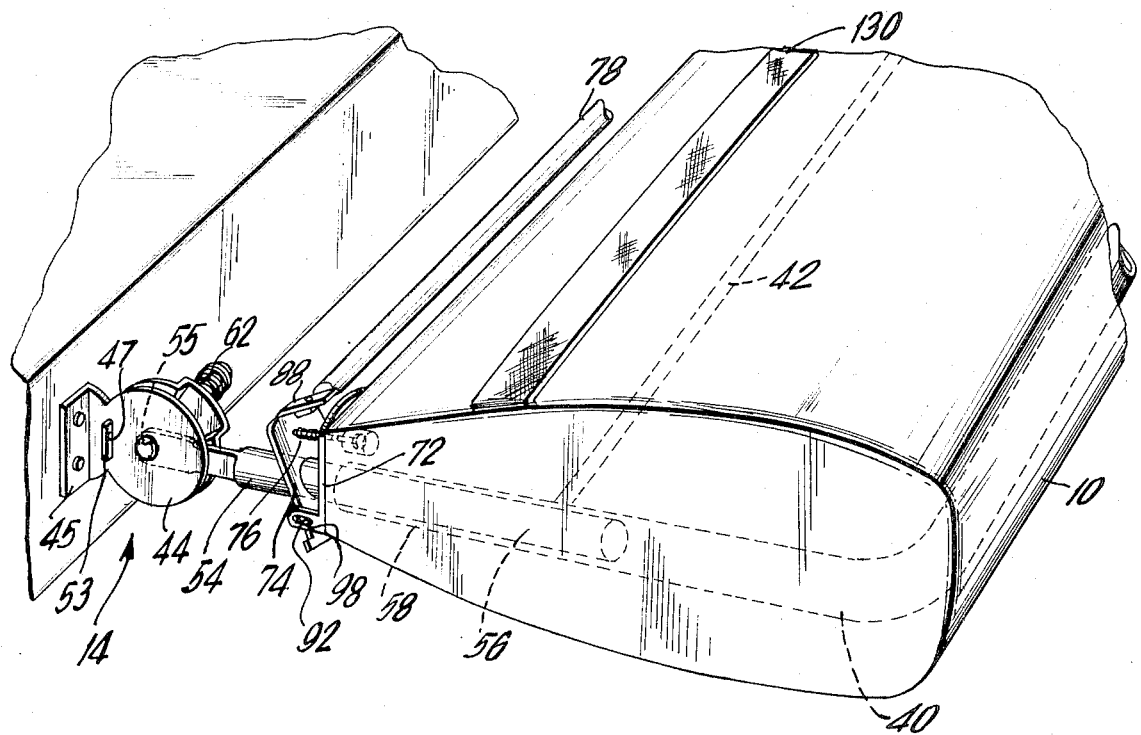
FIG. 7 is an enlarged fragmentary perspective view of the padded cushion showing the spring loaded hinge and the cushion position adjusting mechanism.

Referring now to FIG. 7, there is shown an enlarged fragmentary perspective view of cushion 10, which view is to be representative of all the cushions in the vehicle. Cushion 10 is shown to have an inner tubular frame 40 which provides structural support for the cushion. Frame 40 could be comprised of any suitably structurally supportive material, such as aluminum, steel, etc. and is not limited to tubular material although a tubular frame is described herein. Additional reinforcement bars, such as bar 42 can be made part of the overall tubular frame for added strength. Frame 40 is surrounded by appropriate padded materials such as foam rubber or other pliable material, and the overall cushion can be covered with a suitable fabric, leather or plastic material.

Figure 10:
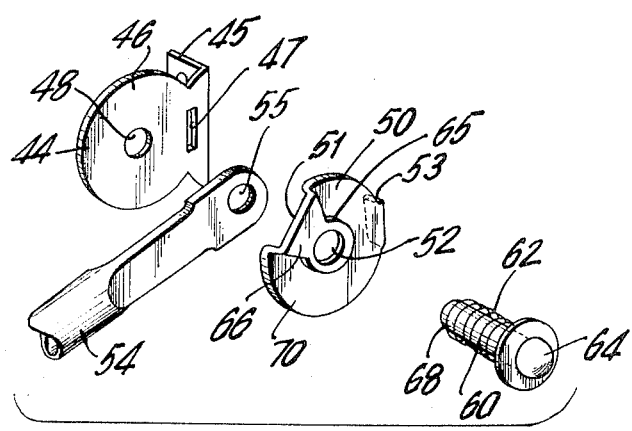
FIG. 10 is an exploded perspective view of the hinge shown in FIG. 7.

While FIG. 7 shows a hinge and adjusting mechanism attached to one end of the cushion, it is to be understood that the other end of the cushion, which is not shown, contains the identical apparatus now to be described. Spring loaded hinge 14 is shown in FIGS. 7 and 10 to consist of an "L" shaped plate 44 wherein one side 45 of "L" shaped plate 44 is fastened to the abutment, which in this example is the instrument panel.

The other side 46 of "L" shaped plate 44 has a slot 47 and a hole 48 formed therein. Hinge 14 also contains a formed plate 50 which has a recessed portion 51, a hole 52 and a bent lip 53. A flattened tubular member or rod 54 having a hole 55 in the flattened section thereof is placed between "L" shaped plate 44 and formed plate 50. The other end 56 of tubular member 54 is so dimensioned to be telescopically engaged within one end 58 of frame 40, as shown in FIG. 7. The respective holes in plate 44, tubular member 54 and formed plate 50 are so aligned as to allow pin 60 to pass therethrough. Pin 60 has a compression spring 62 placed between head 64 of said pin and a back raised portion 65 of formed plate 50, so as to force formed plate 50 toward the tubular member 54. Lip 53 of formed plate 50 extends into slot 47 of "L" shaped plate 44 so as to prevent formed plate 50 from rotating. The friction created between a raised front portion 70 of formed plate 50 and side 46 of "L" shaped plate 44 provides sufficient force to hold tubular member 54 and cushion 10 stationary in either the vertical or horizontal position. Recess 51 in formed plate 50 provides a region of reduced friction force when tubular member 54 is adjacent recess 51. Thus, for example, if recess 51 begins approximately 10° from the vertical plane and extends to approximately 65 degrees from the vertical plane, whenever tubular member 54 and, of course, cushion 10 are positioned between 10 and 65° of the vertical plane, hinge 14 will not provide sufficient force to hold the cushion stationary, and the cushion will be fairly free to move therebetween.

Therefore, as a passenger enters the vehicle he will lift the cushion towards the vertical position so that he will have room to enter the vehicle. If he has placed the cushion in the vertical position, it will remain stationary after he releases it. When he is seated, his view is obstructed by the vertically positioned cushion and he will move the cushion down so as to get a clear view through the windshield, and thus obtaining the protective services of the cushion. Prior to leaving the vehicle, the occupant would again raise the cushion to its vertical position. If the driver desires, he can lower the cushion to approximately 65° from the vertical plane, which he can do easily. Thus his view is not obstructed. The reason for limiting the range of the fairly free movement of the cushion will be explained later in reference to an additional feature of the invention.

Figure 8:
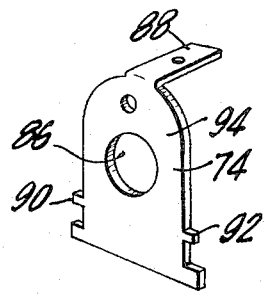
FIG. 8 is an enlarged perspective view of a pivoted cushion locking plate which is part of the position adjusting mechanism shown in FIG. 7.
Figure 9:
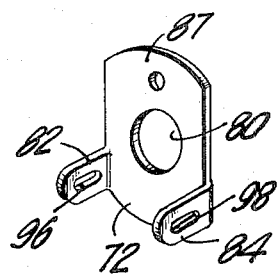
FIG. 9 is an enlarged perspective view of the plate which is fixed to the end of the tubular frame of the cushion and is part of the position adjusting mechanism shown in FIG. 7.

Generally, when the passenger is seated in the vehicle and has placed the cushion in or slightly below the horizontal position, he may for his own comfort want to either push the cushion closer to or away from his body in order that he may comfortably rest his arms on the top surface of the cushion if he so desires. This cushion adjusting mechanism is shown in FIG. 7 and is provided by fixed plate 72, which is attached to the end of the tubular frame of cushion 10, pivoting plate 74, compression spring 76, and release bar 78. It should, of course, be understood that the same cushion adjusting mechanism components are located on the other side of the cushion although not shown in FIG. 7. As shown in FIG. 9, fixed plate 72 has a hole 80 formed therein and slotted tabs 82 and 84 extending from the bottom and perpendicular to the main portion 87 thereof. Pivoting plate 74 is shown in FIG. 8 to have a hole 86 formed therein. An angular section 88 extending from the top thereof, and respective nub portions 90 and 92 extending outwardly from the bottom part of the main portion 94 therefor. Nubs 90 and 92 of pivoting plate 74 conveniently fit into respective slots 96 and 98 in respective tabs 82 and 84 so that, in effect, the bottom part of pivoting plate 74 is secured to fixed plate 72. Compression spring 76 shown in FIG. 7, is mounted between the respective top portions of fixed plate 72 and pivoting plate 74 so as to push the top portion of plate 74 away from fixed plate 72. Tubular member 54 passes through respective holes 86 and 80 in pivoting plate 74 and fixed plate 72. The diameter of tubular member 54 is sufficiently smaller than hole 86 in pivoting plate 74 to allow the top portion of pivoting plate 74 to be pushed by spring 76 away from fixed plate 72 until the top and bottom parts of hole 86 engage tubular member 54 in an angular manner so as to create sufficient frictional force to lock cushion 10 onto tubular member 54 in its desired fixed position. Release bar 78 is rigidly attached to the top of angular section 88 of pivoting plate 74. Therefore, if the passenger desires to adjust the position of cushion 10 relative to tubular member 54, he would grip release bar 78, and move it towards him a sufficient distance so that the top and bottom part of hole 86 in pivoting plate 74 no longer sufficiently engages tubular member 54 to create enough frictional force to hold cushion 10 stationary relative to tubular member 54. Thus, once release bar 78 is moved sufficiently forward, cushion 10 is now free to move relative to the telescoping tubular member 54. Thus, once release bar 78 is moved sufficiently forward, cushion 10 is now free to move relative to the telescoping tubular member 54 so as to finally position the cushion in accordance with the desire of the passenger. Once the cushion is so positioned, release bar 78 is released and spring 76 forces the top and bottom parts of the hole 86 in pivoting plate 74 against tubular member 54 in an angular manner as to prevent any further backward movement of cushion 10 relative to tubular member 54.

Figure 11:
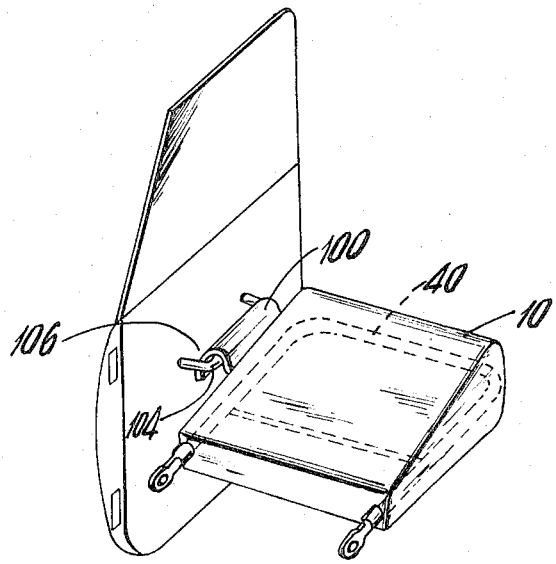
FIG. 11 is a perspective view of the cushion placed in the horizontal position and having a door engaging hook.

Another feature of the invention is illustrated in FIG. 11 wherein padded cushion 10 is provided with an engaging hook 100 which is fastened to frame 40 as shown in dotted lines. Side door 102 is shown to have a shaped bar 104 fastened thereto in such a manner as to form a slot 106 therebetween. When the padded cushion 10 is pushed downward towards the horizontal position, engaging hook 100 slips into slot 106 so as to, in effect, lock door 102, thereby providing an additional means of keeping door 102 from opening in the event of a side collision between the vehicle and another vehicle or object. When the passenger is ready to leave the vehicle, he will raise cushion 10 to the vertical position. Door 102 may then be opened and the passenger can disembark. Prior to leaving the vehicle, the driver will leave cushion 10 in its vertical position or at the base position of the cushions fairly free range of movement, so that engaging hook 100 is not in communication with bar 104, thereby permitting door 102 to be opened when desired.

Figure 12:
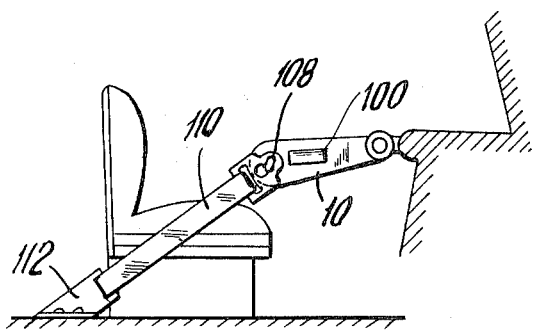
FIG. 12 is a side view of the horizontally positioned padded cushion having a hook attached to one end of a strap, the other end of the strap being anchored to the floor of the vehicle.
Figure 13:
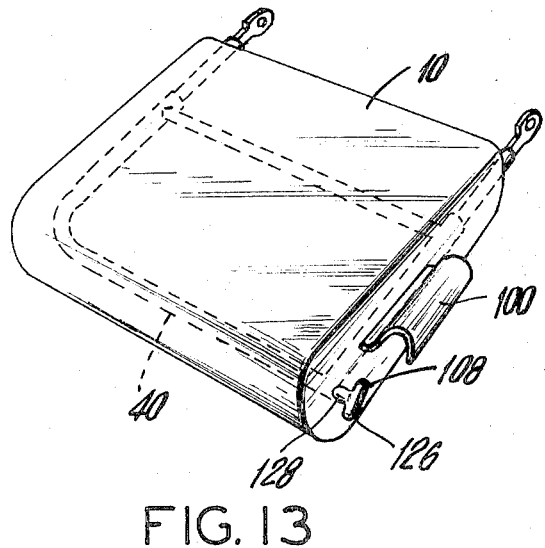
FIG. 13 is an enlarged perspective view of the cushion shown in FIG. 12, which cushion includes the hook.
Figure 14:
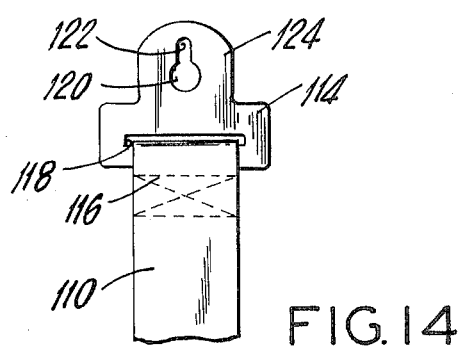
FIG. 14 is an enlarged fragmentary top view of the strap shown in FIG. 12.

In another embodiment of the invention shown in FIG. 12, padded cushion 10 has a hook 108 extending therefrom attached to one end of a strap 110. Strap 110 has the other end thereof anchored at 112 to a spring loaded shaft, which shaft provides sufficient force to render strap 110 automatically retractable. This strap arrangement prevents the occupant from being forced against the side of the vehicle or being thrown from the vehicle if the door opens accidentally. As shown in dotted lines in FIG. 13, hook 108 is internally attached to frame 40. As shown in FIG. 14, strap 110 has a buckle member 114 fastened to the end thereof via stitching 116 which is sewn through overlapping portions of strap 110. The overlapping portions, of course, are formed by fitting the strap through slot 118 in buckle member 114. Buckle member 114 has a hole 120 and a slotted hole 122 formed in the top portion 124 thereof. A head 126 (shown in FIG. 13) of hook 108 fits into hole 120 and a body 128 (also shown in FIG. 13) of hook 108 slides into slotted hole 122 of buckle member 114 so as to fasten strap 110 to cushion 10.

It should also be noted that a flexible belt or strap 130 (shown in FIGS. 1, 4 and 7) can be attached to the cushion so as to allow the occupant to grab a hold of the strap so that he may brace himself. Strap 130 can be made of a suitable fabric or leather material and can be sewn or stitched to the ends of the cushion, or it may even surround the cushion.

It is thus seen that there is provided an assembly for protecting a passenger of a vehicle which achieves the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having now described the invention, there is claimed as new and is desired to be secured by letters Patent:

1. An assembly for protecting a passenger of a vehicle comprising a padded cushion, said padded cushion including an internal tubular frame and padded material surrounding said frame, hinge means coupled to said padded cushion for allowing said cushion to move between a horizontal and vertical position, said hinge means being supported by an abutment located in front of a seat for the passenger, whereby said cushion is moved toward the vertical position when the passenger is entering or exiting the seat and said cushion is moved toward the horizontal position after said passenger is seated and is adjacent to the passenger's body, means coupled to said hinge means for sliding said cushion toward and away from said abutment so as to allow the passenger to comfortably place said cushion a desired distance from his body when he is seated, said hinge means including first and second spring loaded hinges, each of said hinges including an "L" shaped plate, one side of said plate being fastened to the abutment, another side of said plate having a hole formed therein, a tubular member, one end of said tubular member being telescopically positioned within a portion of said tubular frame, another end of said tubular member being positioned adjacent said "L" shaped plate, said tubular member having a hole formed therein located adjacent said another end thereof, a formed plate having a hole and recess therein, one face of said formed plate being positioned adjacent said tubular member, and a spring loaded pin passing through the holes in the respective "L" shaped plate, tubular member and formed plate, the recess in said formed plate being so located as to allow said tubular member and padded cushion to move relatively freely between approximately the vertical position and a plane between the vertical and horizontal positions.

2. An assembly according to claim 1 wherein the plane forms an angle of approximately 65° with the vertical position.

3. An assembly according to claim 1 wherein said sliding means is coupled to each spring loaded hinge, and that portion of said sliding means coupled to each hinge includes:
a first plate, having a hole therein, fastened to said cushion;
a second plate having a hole therein, one end of said second plate being fastened to said first plate, said tubular member passing through the holes in the respective first and second plates, wherein the diameter of the hole in said second plate is larger than the diameter of the tubular member to such a degree as to allow the plane of said second plate to shift relative to the plane of the axis of said tubular member;
a compression spring connected between the respective top portions of said first and second plates to force said second plate to move to a plane such that the top and bottom parts of the hole in said second plate engage said tubular member in an angular manner as to lock said cushion in a desired fixed position; and
a release bar coupled to the top edge of said second plate whereby said padded cushion can move in relation to said tubular member when said release bar is moved toward said first plate a sufficient distance so that the top and bottom parts of the hole in said second plate become frictionally disengaged from said tubular member.

4. An assembly for protecting a passenger of a motor vehicle sitting on the outboard portion of a front seat thereof comprising a motor vehicle having a front seat, a windshield and an instrument panel, a padded cushion located in front of the passenger portion of said front seat and having an elongated opening extending at least partially therethrough, hinge means coupled to said padded cushion and to said instrument panel for allowing said padded cushion to move between a horizontal position located in front of and adjacent a passenger sitting on the front seat and a vertical position wherein said padded cushion is spaced from a passenger sitting on said front seat, said padded cushion being dimensioned so that in said vertical position the forward view of a passenger sitting on the front seat of said motor vehicle is obstructed whereby a passenger sitting on the front seat will move said padded cushion to its horizontal position in order that he will be able to look through the windshield and by so doing will protect himself from striking said instrument panel in case of a sudden stop or accident, means connected to said hinge means for enabling said padded cushion to slide toward and away from said instrument panel when in the horizontal position, said connecting means including a member extending into said padded cushion elongated opening with said padded cushion movable relative to said member, locking means connected to said padded cushion and surrounding said member, said locking means having a locking position wherein said member is firmly secured by said locking means and said padded cushion cannot move relative to said member and a non-locking position wherein said locking means can move relative to said member and said padded cushion can move relative to said member, spring means biasing said locking means to the locking position and hand operated movable release means connected to said locking means for moving said locking means against the bias of said spring means to the non-locking position whereby said padded cushion can be selectively moved relative to said member.

5. An assembly for protecting a passenger of a motor vehicle sitting on a rear seat thereof comprising a motor vehicle having a rear seat and a front seat, a padded cushion having an elongated opening extending at least partially therethrough, hinge means coupled to said padded cushion and to the rear of said front seat for allowing said padded cushion to move between a horizontal position located in front of and adjacent a passenger sitting on said rear seat and a vertical position wherein said padded cushion is spaced from a passenger sitting on the rear seat, said padded cushion being dimensioned so that in the vertical position the forward view of a passenger on the rear seat is obstructed whereby a passenger on the rear seat will move said padded cushion to its horizontal position in order that he will be able to look in a forward direction and by so doing he will protect himself from striking the front seat in case of a sudden stop or accident, means connected to said hinge means for enabling said padded cushion to slide toward and away from a passenger sitting on said rear seat when in the horizontal position, said connecting means including a member extending into said padded cushion elongated opening with said padded cushion movable relative to said member, locking means connected to said padded cushion and surrounding said member, said locking means having a locking position wherein said member is firmly secured by said locking means and said padded cushion cannot move relative to said member and a non-locking position wherein said locking means can move relative to said member and said padded cushion can move relative to said member, spring means biasing said locking means to the locking position and hand operated movable release means connected to said locking means for moving said locking means against the bias of said spring means to the non-locking position whereby said padded cushion can be selectively moved relative to said member.

* * * * *